July 21, 1964 A. ZAROUNI 3,141,931

TELEPHONE ANSWERING EQUIPMENT

Filed Jan. 19, 1962 3 Sheets-Sheet 1

INVENTOR
A. ZAROUNI
BY R. C. Winter
ATTORNEY

TELEPHONE ANSWERING EQUIPMENT

Filed Jan. 19, 1962

INVENTOR
A. ZAROUNI
BY
R. C. Winter
ATTORNEY

INVENTOR
A. ZAROUNI

BY R. C. Winter
ATTORNEY

United States Patent Office 3,141,931
Patented July 21, 1964

3,141,931

TELEPHONE ANSWERING EQUIPMENT

Alfred Zarouni, Brooklyn, N.Y., assignor to Bell Telephone Laboratories, Incorporated, New York, N.Y., a corporation of New York Filed Jan. 19, 1962, Ser. No. 167,310
25 Claims. (Cl. 179—6)

Figures 1, 4:
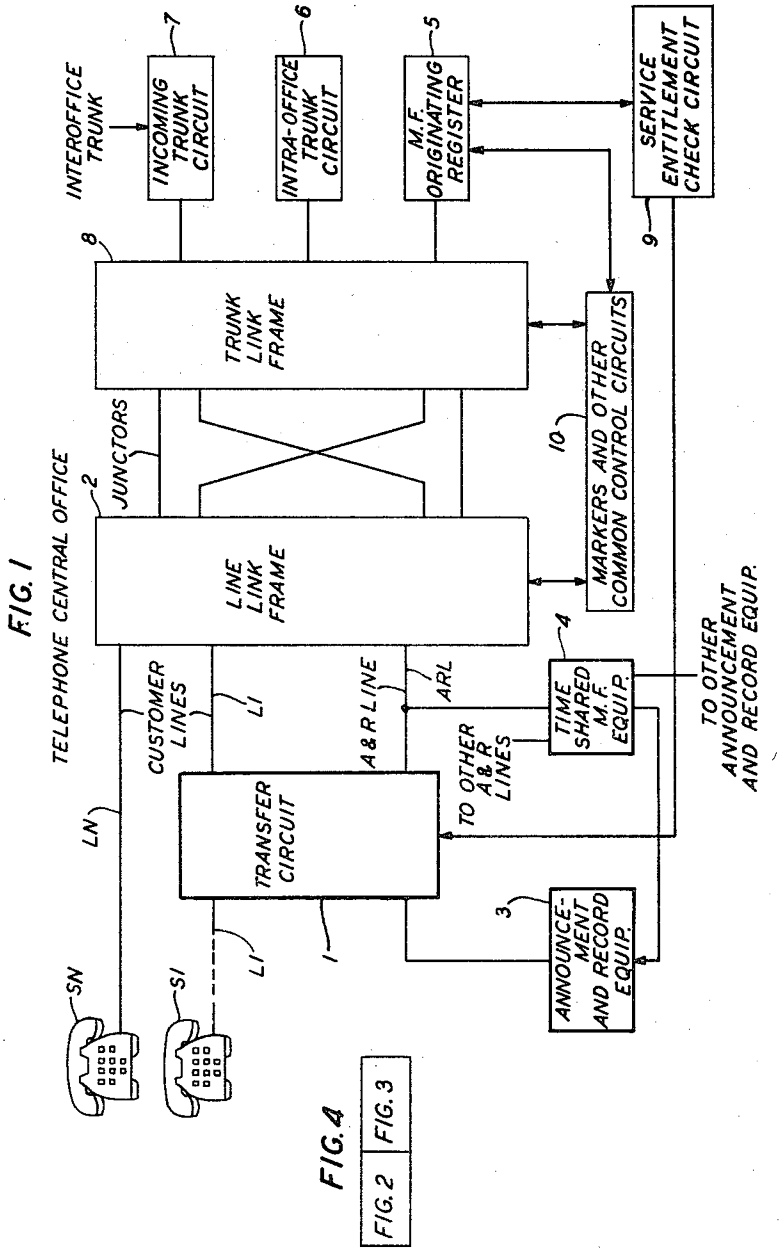

This invention relates to telephone answering systems and particularly to systems employing call answering equipment in telephone offices.

Equipment is frequently provided in telephone systems for automatically answering calls to customer stations when the called party is not available to do so. Such equipment is usually arranged to answer each call with a recorded announcement, to record any message from the caller and, afterward, to play back the recorded messages to the called customer. A variety of other features are also usually supplied by this equipment. For example, the customer generally is permitted to record and check his own answer announcement, and to repeat and skip certain messages during a playback.

To provide these and other features, present-day equipment is usually located on the customer premises. As a result, installation and maintenance procedures are complicated because telephone personnel must visit many locations to install and service the equipment. In addition, the customer desiring such answering service is presented with a space problem in locating the additional equipment adjacent his telephone. Obviously, such conditions increase the cost of the service.

In order to reduce the service cost and simplify installation and maintenance procedures, answering equipment is sometimes located at a telephone office. Although such arrangements overcome to some extent the foregoing obstacles, the provision of many features of answering service which are frequently requested or required by customers is not possible. For instance, the customer cannot record his own answer announcement; instead, he is required to use one prepared by the telephone company. Moreover, he is given no control over the repeating or skipping of messages during a playback. The service is further restricted in that the customer can only obtain a message playback at his own station. For reasons such as these, answering systems of this type have proven inadequate for most customer needs and requirements, and, consequently, are not extensively used.

In view of the foregoing, objects of this invention are to minimize the cost of telephone answering service and to simplify its maintenance, while at the same time fulfilling the various needs and requirements of telephone customers.

It is another object of this invention to improve centralized telephone answering service by employing equipment at a telephone office for enabling a customer to record and check his own answer announcement without the assistance of telephone personnel.

Another object is to improve centralized telephone answering service whereby the customer is able to control the repeating and skipping of recorded messages during a playback.

A further object is to improve centralized telephone answering service whereby the customer may call the answering equipment from any station and obtain a playback of messages recorded while he was absent from his own station.

These and other objects are attained in accordance with an exemplary embodiment of the invention wherein answering equipment is located at the telephone central office and is activated by orders from a customer station to record and play back an announcement dictated by the customer, to answer each subsequent incoming call to the customer station with the recorded announcement, to record any message received from the caller, and to play back the recorded messages.

Each customer who desires telephone answering service is assigned two line appearances in the switching network at the central office. One is connected to the customer answering equipment and with the line connected to the customer station, and is used for ordinary telephone service. The other appearance is connected to the answering equipment by means of an answer and record line. The latter line is a so-called "unlisted" line, that is, one without a published directory number, and is used for allowing the customer to control his answering equipment.

For controlling the operation of the answering equipment, the customer originates a call to the answer and record line and sends orders by multifrequency (MF) tones from a customer telephone to request a connection to a multifrequency receiver circuit. The latter circuit is utilized on each call for a very short interval. Consequently, it is shared on a time basis by a plurality of answer and record lines. After the requested connection is established, other order tones are transmitted from the calling station to the receiver which translates and conveys the orders to the announcement and recording facilities and to a transfer circuit connected to the customer line.

Customer orders direct the announcement facilities to record an announcement dictated by the customer and thereafter to play back the recorded announcement to him so that it may be checked. Orders to activate the answering service are also transmitted by the customer, which orders serve to operate the transfer circuit so that subsequent incoming calls on the customer line are transferred to the announcement and recording facilities. These facilities then answer incoming calls, provide the announcement, and record the messages received from the callers. Other customer orders control the playback of the recorded messages to the customer and direct the recording facilities to repeat and skip certain of the recorded messages. The customer also sends an order to the answering equipment for deactivating the answering service.

The answering equipment also comprises a circuit for assuring that only a caller at the entitled customer station is able to erase and record an answer announcement and to activate and deactivate the answering service. A resultant advantage is that nonentitled customers are unable to misuse the answering equipment.

A salient advantage of my invention is that the customer may originate a call from any telephone station to the answer and record line and automatically obtain a playback of recorded caller messages. Another advantage is that customer orders for controlling the repeating and skipping of recorded caller messages may be transmitted to the answering equipment from any customer station equipped with a telephone set arranged to send multifrequency tones.

A feature of the present invention is that a customer station entitled to telephone answering service is served at the telephone office by equipment which may be called from the customer station to record an announcement dictated by the caller, and thereafter, conditioned to answer subsequent calls to the station with the recorded announcement.

Another feature is that the answering equipment comprises facilities for recording messages received from lines calling the customer station entitled to answering service, that these facilities are associated with an answer and record line at the telephone office, and that the customer is able to call the line from any customer station for obtaining a playback of the recorded messages.

Another feature is that the telephone office comprises facilities for assuring that only a caller at the station entitled to the answering service is able to record the answer announcement.

It is another feature that each customer entitled to answering service is assigned an answer and record line in the central office and that a caller at the customer station is able to call the line and send order signals thereto for activating and deactivating a transfer circuit which connects incoming calls from the customer line to the facilities that answer the calls with the recorded announcement.

Another feature is that the transfer circuit comprises a device connectable to the customer line for detecting incoming calls on the line, apparatus responsive to an order signal received over the answer and record line from the customer station for connecting the detecting device to the customer line, and facilities activated by the detecting device for supplying the recorded announcement to the customer line to answer incoming calls.

A further feature is that the answering equipment comprises a circuit which is connectable to the answer and record line for translating customer order signals and for conveying the orders to the announcement and recording facilities and to the transfer circuit.

Another feature is that the answering equipment includes a lockout circuit for connecting a plurality of answer and record lines one at a time to the translating circuit.

Still another feature is that the translating circuit comprises apparatus responsive to order signals from the entitled station for activating and deactivating the answering service and for controlling the recording of the answer announcement.

Another feature is that the translating circuit includes facilities for enabling only order signals from the entitled station to activate and deactivate the answering service and to control the recording of the announcement.

A further feature is that the translating circuit comprises apparatus responsive to order signals from any customer station for controlling the repeating and skipping of recorded messages during a playback from the recording facilities.

Figure 2:
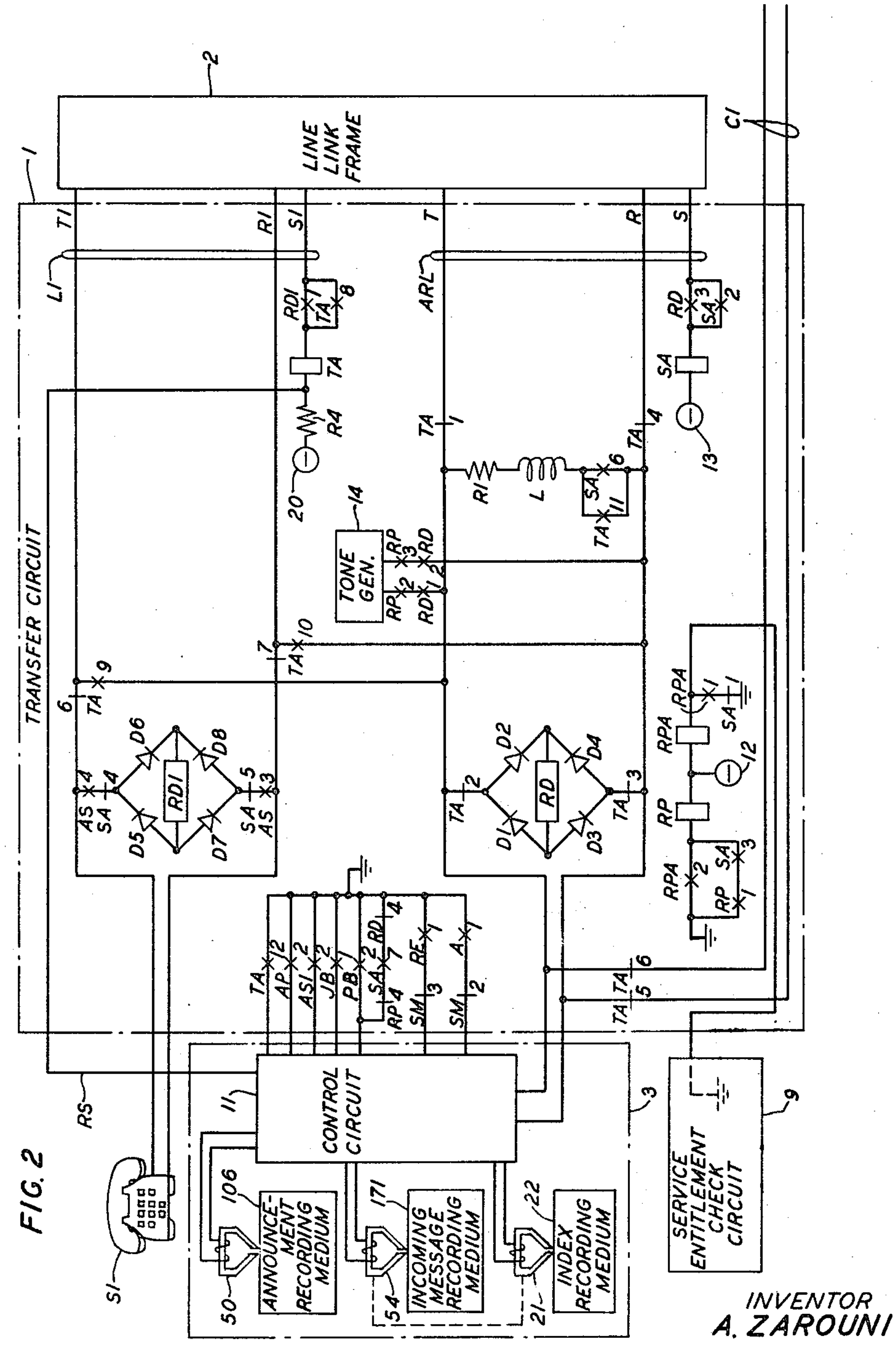
Figure 3:
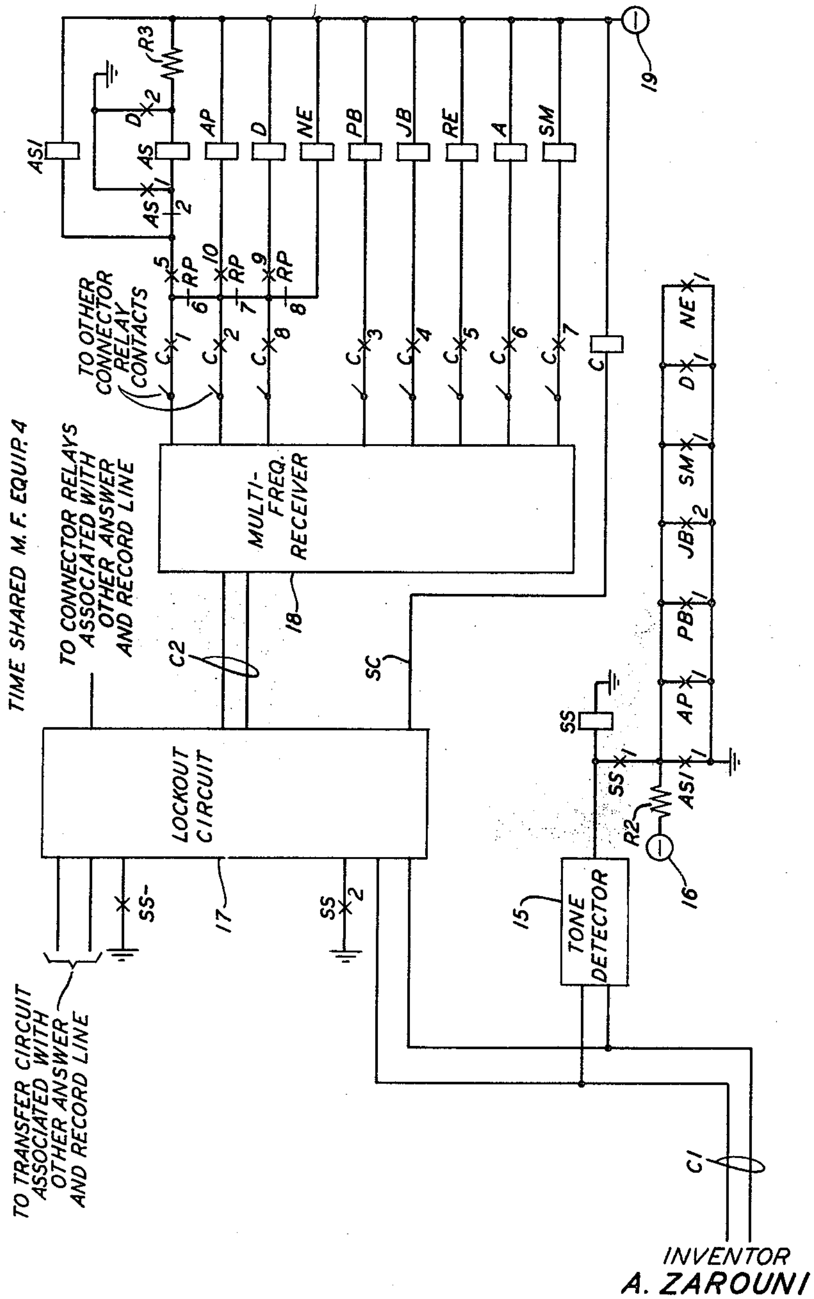

The foregoing and other objects, advantages and features of this invention will be more clearly understood by a reading of the following description of an exemplary embodiment thereof shown in the drawing in which:

FIG. 1 shows, in block diagram form, the interrelation of the components of the exemplary embodiment;

FIGS. 2 and 3 show in greater detail some of the components including a transfer circuit, line link frame, customer line, answer and record line, announcement and record equipment, service entitlement check circuit, and time shared multifrequency equipment comprising a tone detector, lockout circuit, multifrequency receiver, and associated connector and control relays; and FIG. 4 depicts the position in which FIGS. 2 and 3 should be placed.

It will be noted that FIGS. 2 and 3 employ a type of notation referred to as "detached-contact" in which an "X" represents a normally open contact of a relay and a vertical bar represents a normally closed contact of a relay; "normally" referring to the unoperating condition of a relay. The principles of this type of notation are described in an article entitled "An Improved Detached-Contact-Type Schematic Circuit Drawing" by F. T. Meyer in the September 1955 publication of the American Institute of Electrical Engineers Transactions, Communications and Electronics, vol. 74, pages 505–513.

The answering equipment of the present invention may be advantageously incorporated in an automatic telephone system wherein common control circuits are employed to control the establishment of calls through a switch network. One such system is disclosed in A. J. Busch Patent 2,585,904, issued February 19, 1952. It is to be understood, however, that the present invention is not limited to use with a telephone system of this type but may be utilized with other types of switching systems.

The invention described herein is embodied in a telephone system of the type disclosed in the cited Busch patent. It is particularly concerned with apparatus in the transfer circuit 1, time shared MF equipment 4 and the announcement and record equipment 3 which are represented by the blocks shown in heavy lines in FIG. 1. The other equipment units are neither shown nor described in detail herein except where necessary for a complete understanding of the invention. The following patents may be consulted for a complete understanding of the construction and operation of the units not covered in detail herein.

For the purpose of illustration, it is intended that the apparatus of the line link and trunk link frames 2 and 8 respectively, intraoffice and incoming trunk circuits 6 and 7 respectively, and common control circuit 10 be similar to the corresponding apparatus disclosed in the Busch patent; and that the service entitlement check circuit 9 correspond to the repertory translation dispatcher circuit disclosed in FIGS. 30, 31 and 32 of the W. A. Malthaner et al. Patent No. 2,951,908, issued September 6, 1960. The MF originating register 5, used in this disclosure may be the same as the dial pulse originating register disclosed in the Busch patent except that it employs a well-known MF receiver to receive combinational, nonharmonically related tones representing digits of a code, and to translate them into direct current pulses so that the transmitted digits can be stored in an originating register as disclosed in the Busch patent. An MF receiver suitable for use with the Busch originating register is disclosed in W. V. K. Large et al. Patent 2,826,638, issued March 11, 1958.

The general organization of the principal equipment units of the system will now be described with reference to FIG. 1. Each customer station entitled to call answering service is connected over a customer line through a transfer circuit in the central office to a line link frame. Other customer stations, which are not entitled to such service, are connected directly over customer lines to line link frames in the office. Illustrative of these arrangements are the connections of the entitled station S1 over line L1 through the transfer circuit 1 to the line link frame 2 and the nonentitled station SN over line LN to frame 2.

Each transfer circuit, such as circuit 1, is also connected to an individual announcement and record line, such as line ARL, and to announcement and record equipment, such as equipment 3, which is provided on an individual basis for the customer station associated with the transfer circuit. Announcement and record lines, such as line ARL, are also terminated on line link frames, such as frame 2. The time shared MF equipment 4 is connected with the announcement and record lines and with the announcement and record equipments associated with these lines.

Originating registers, such as register 5, and intraoffice and incoming trunk circuits, such as circuits 6 and 7, are terminated on trunk link frames, such as frame 8. As is fully disclosed in the Busch patent, lines terminated on line link frames and circuits on trunk link frames are interconnected by means of crossbar switches on these frames and by the interframe junctors. All such interconnections are effected under control of a common group of circuits including the markers and other control circuits 10. Multifrequency originating registers are connectable to the check circuit 9 on certain calls originated from customer lines to the answer and record lines in order that the entitlement of these lines to such service may be determined.

The cooperation of the various circuits with one another in providing the answering service will now be described with reference to customer station S1.

CALL TO ANSWER AND RECORD LINE FROM ENTITLED CUSTOMER STATION

As is described in the Busch patent, when the customer at station S1 lifts the telephone handset from the switch hook, a line circuit is operated on the frame 2 and causes line L1 to be connected to an idle one of the markers 10. After the latter connection is established, the selected marker determines the class of service and the equipment number of line L1 on frame 2, selects an idle MF originating register, such as register 5, and then transmits the class of service and equipment number of line L1 to the selected register wherein the information is stored. The marker then operates crossbar switches on frames 2 and 8 to establish a communication channel between line L1 and the selected register, transfers control over the channel to the register and then releases. The register now furnishes dial tone to the calling customer and is ready to receive digits from the calling station.

When line ARL is called from station S1, the customer uses an abbreviated code comprising two digits. This code notifies the originating register that the circuit 9 must be employed on the call to check whether station S1 is entitled to be connected to line ARL. As is hereinafter explained, this check is made for assuring that only a caller at station S1 is able to erase and record an answer announcement and to activate and deactivate service.

Following the reception of dial tone, the customer depresses the pushbuttons of his telephone set to transmit to the register the MF signals representing the two digit code which identifies line ARL. Upon the registration of this code in the register, the latter circuit activates the circuit 9 and sends thereto the received code and the equipment number and class of service of line L1 to enable circuit 9 to check whether the station S1 is entitled to be connected with line ARL.

As is similarly disclosed in the cited Malthaner et al. patent in column 60 under the heading "Repertory translation dispatcher," circuit 9 includes facilities which store the identity of lines entitlement to special (answering) service and supply the complete directory numbers of certain called lines. Upon the receipt of the equipment number and the class of service of line L1 from the originating register 5, circuit 9 compares the latter information with the stored identity of the entitled lines. After it is determined that the calling customer is entitled to the requested service, the complete directory number of line ARL is transmitted from circuit 9 to the register 5.

At the same time, circuit 9 momentarily completes an obvious operate circuit for relay RPA in the transfer circuit 1 of FIG. 2. Circuit 9 then releases. Upon operating, relay RPA closes a locking path for itself through its contact 1 and contact 1 of the relay SA of FIG. 2. Relay RPA also closes its contact 2 to complete the circuit through the winding of relay RP to the negative potential 12 for operating relay RP. The latter relay is so operated only on calls from station S1 for closing its contacts 5, 9 and 10 to partially complete operate circuits for the relays AS, AS1, AP and D of FIG. 3 and thereby, as explained later, to enable only a caller at station S1 to erase and record the answer announcement and to activate and deactivate the answering service.

If the aforementioned service code was received from a line not entitled to be connected to line ARL, circuit 9 would recognize this condition and transmit to the register 5 the code designation of a tone trunk for causing a reorder tone signal to be sent to the calling customer in a manner as is disclosed in the Busch patent. In this way, circuit 9 assures that only line L1 is connected to the equipment 3.

After the directory number of line ARL is received by the originating register 5, the latter circuit engages an idle one of the markers 10 and then transmits the equipment number of the calling line and the directory number of line ARL to the marker. After registering the received information, the marker determines with the aid of other common control circuits the equipment location of line ARL. While the marker is obtaining the latter information, it selects an idle intraoffice trunk circuit, such as circuit 6.

Upon obtaining the equipment location of line ARL, the marker operates crossbar switches on the line and trunk link frames 2 and 8 to establish a communication channel between lines L1 and ARL through the selected trunk circuit. The marker then sets up a ringing condition to line ARL, transfers control over the ringing and the call supervision to the trunk circuit, and thereafter releases itself and the register from the call connections.

Referring now to FIG. 2, when ringing voltage is applied to conductors T and R of line ARL, it is extended through contacts 1 to 4 of relay TA and the full wave rectifier comprising the diodes D1 to D4 to operate the relay RD. When operated, the latter relay closes its contacts 1 and 2 to connect an order tone from the tone generator 14 through contacts 2 and 3 of relay RP and contacts 1 and 4 of relay TA to the communication channel extending between lines ARL and L1. This tone informs the calling customer to send his order.

Upon operating, relay RD also closes its contact 3 to complete the circuit from ground potential on the sleeve conductor S through the winding of relay SA to the negative potential 13 for operating relay SA. Ground is applied to conductor S, as is explained in the Busch patent, when the hold magnets of the crossbar switches are operated to close the channel between line ARL and the intraoffice trunk circuit.

When relay SA operates, it closes its contact 2 to lock itself operated under the control of ground on conductor S. Relay SA also completes a locking path for relay RP through its contact 3 and contact 1 of relay RP. Upon operating, relay SA also opens its contact 1 to cause the release of relay RPA. The operated relay SA also closes its contact 4 to connect the inductor L and resistor R1 across the conductors T and R for tripping ringing on line ARL and for maintaining an "off-hook" condition on line ARL. After ringing is tripped, the slow release relay RD releases and opens its contacts 1 and 2 to disconnect the order tone from line ARL.

CONTROL DIGITS

Nine of the ten digits 0 to 9 transmittable from the customer telephone were used in the exemplary embodiment for controlling the operation of the announcement and record equipment 3 after connections have been established between line L1 and ARL. Each of these digits is transmitted by multifrequency tones.

The following table indicates the decimal digits transmittable from the telephone set, the tones corresponding to these digits and the control functions identified with these digits.

*Table I*

| Digit | Tones | Function |
|---|---|---|
| 0 | 1,300, 1,500 | Access. |
| 1 | 700, 900 | Announcement Preparation. |
| 2 | 700, 1,100 | Acitvate Service. |
| 3 | 900, 1,100 | Message Playback. |
| 4 | 700, 1,300 | Jumpback. |
| 5 | 900, 1,300 | Reverse. |
| 6 | 1,100, 1,300 | Advance. |
| 7 | 700, 1,500 | Stop. |
| 8 | 900, 1,500 | Deactivate Service. |

ACCESS TO TIME SHARED MF EQUIPMENT

After receiving the order tone, the customer depresses the telephone pushbutton to transmit to line ARL the access digit 0 for causing an MF receiver to be connected to line ARL. When this digit is received at line ARL, it is extended through contacts 1, 4, 5 and 6 of relay TA over cable C1 to the tone detector 15 in the time shared MF equipment of FIG. 3. Detector 15 comprises a sharply tuned filter which responds to the received tones and produces an output voltage sufficient to cause the operation of the relay SS of FIG. 3. Upon operating, relay SS closes a locking path for itself through its own contact 1 and resistor R2 to the negative potential 16.

When operated, relay SS closes ground potential through its contact 2 to the lockout circuit 17 of FIG. 3 to request that the MF receiver 18 be connected to cable C1. Lockout circuit 17 is shown in block diagram form because many of the presently available lockout circuits are suitable for use in this embodiment. For example, a suitable circuit is shown in Fig. 15–3 of the book "Design of Switching Circuits" by W. Keister, A. E. Ritchie and S. H. Washburn, published by D. Van Nostrand Co., Inc.

In this exemplary embodiment, only one circuit arrangement is set forth for connecting any one of a plurality of different transfer circuits with a MF receiver. Other such circuit arrangements including a plurality of lockout circuits and MF receivers may also be used for serving many simultaneous requests for MF receivers. A receiver suitable for use herein is disclosed in the aforementioned Large et al. patent.

When receiver 18 is idle, lockout circuit 17 connects cable C1 to receiver 18 over cable C2, locks out other transfer circuits served by receiver 18, and then applies ground potential to conductor SC for completing the obvious circuit for operating relay C. Upon operating, relay C closes its contacts 1 to 8 for connecting receiver 18 with the control relays AS, AS1, AP, PB, JB, RE, A, SM, and D. These relays, as hereinafter explained, control the operation of the announcement and record equipment 3 of FIG. 2.

RECORDING THE ANSWER ANNOUNCEMENT

Following the establishment of connections between line ARL and MF receiver 18, the customer transmits the digit 1 to receiver 18 for causing the equipment 3 to prepare for recording the answer announcement. Receiver 18 translates the received digit and extends ground potential through contact 2 of relay C and contact 10 of relay RP to complete the obvious operate circuit for relay AP.

When operated, relay AP closes its contact 1 to shunt the winding of relay SS to ground and thereby cause it to release.

As a result, contact 2 of relay SS is open to effect the release of lockout circuit 17 and receiver 18 and thereby makes them available to serve other calls. When circuit 17 releases, it in turn opens the operate circuits for relays C and AP and causes both relays to release. The equipment of FIG. 3 is thus returned to its idle or normal condition.

The circuit action to be described presently is that which occurs within the announcement and record equipment 3 when relay AP is operated. Before proceeding with the description, however, it is advisable at this point to present a brief description of the equipment 3 in order that its role in the system may be clearly understood. Equipment 3 may be similar to the recording and reproducing equipment disclosed in the C. R. Keith et al. Patent 2,761,899, issued September 4, 1956, provided that the modifications hereinafter set forth are made. It will be apparent to those skilled in the art that reference to the equipment disclosed in the latter patent is not intended in any way to be limiting in the scope of the invention because many other recording and reproducing equipments, such as those employing magnetic tapes and the like, are also siutable for use with the present invention.

The chief features of the equipment disclosed in the Keith et al. patent comprise a "talk-out" recording facility including the transducer 50 and recording medium 106 to record an answer announcement and to reproduce the announcement for checking purposes and for transmission to any calling party. It also comprises "talk-in" recording facilities including the transducer 54 and recording medium 171 to record twenty distinct 30 second messages received from calling parties and to reproduce or play back the recorded messages. In addition to the foregoing, it is intended that the recording equipment comprise facilities including the transducer 21 and recording medium 22 for supplying prerecorded index messages to line ARL. Twenty distinct 30 second messages are prerecorded on medium 22. Each of the messages may consist of a single sentence, such as "This is the tenth message," which is repeated a number of times within the 30 second interval. As is later described, each message is used to notify the calling customer of the number of a message recorded on medium 171.

As disclosed in Keith et al. patent, a number of normally operated switches are used for conditioning the equipment to perform the aforementioned functions. For this exemplary embodiment, it is intended that these switches be replaced by automatic switches which are controlled by contacts of the control relays of FIG. 3. In addition to the foregoing modifications, it is intended that the recording equipment be modified to include circuitry for controlling the playback of recorded messages. It is desirable that the latter circuitry control, for example, the advance and reverse movement of the transducers 54 and medium 171 at predetermined speeds and fixed increments and that this circuitry, in turn, be controlled by contacts of the control relays of FIG. 3. The features incorporated into the Keith et al. recording and reproducing equipment by these modifications are well known and can readily be added by those skilled in the art.

Returning now to the previous description, when relay AP operated, a momentary ground was extended through its contact 2 for signaling the control circuit 11 of equipment 3 to erase the recording medium 106 and then to connect the transducer 50 to line ARL for recording the announcement to be received by the calling customer. After the latter connection is established, a tone signal is sent to the customer to indicate that the desired announcement may be dictated into equipment 3.

Recording medium 106 is designed to record an announcement of approximately 30 seconds duration. In cases where the customer's dictation is not finished when the 30 second interval has expired, the recording is immediately played back to notify the customer that the announcement is too long. On the other hand, when the dictation period is less than 30 seconds, equipment 3 detects the end of distation and operates after a predetermined interval following the end of distation to play back the recorded announcement. This playback arrangement permits the customer to check the recorded announcement. After the playback is completed, equipment 3 is switched into the automatic answer condition. The customer may then place the telephone handset on the switchhook and thereby signal the central office equipment to disengage the switch connections between lines ARL and L1. The manner in which such connections are disengaged is described in columns 103 and 104 of the Busch patent. The circuits of FIG. 2 are then restored to the condition in which they rested prior to the receipt of the call on line ARL.

In the event the customer is not satisfied with the recorded announcement and desires to change it before disengaging the call connections, the access and announcement digits are successively transmitted as previously explained, so that the recorded announcement is erased from medium 106 and a new one can be recorded.

ACTIVATE CALL ANSWERING SERVICE

Call answering service may be activated either immediately after the answer announcement is played back or at some later time. In the latter case, however, the customer must initiate a call from station S1 to the line ARL in a manner as described previously.

The activate service digit is a 2. When the customer desires to activate the service after a communication channel has been established from line L1 through the central office to line ARL, he depresses sequentially the telephone pushbuttons to transmit the access and activate digits. As previously explained, the digit 0 is extended from line ARL to detector 15 for causing the operation of relay SS which, in turn, operates the lockout circuit 17 for connecting receiver 18 to line ARL and for operating relay C. When the digit 2 is transmitted to line ARL, it is extended to MF receiver 18 which translates it and connects ground potential through contact 1 of relay C and contact 5 of relay RP to complete the parellel circuits through the winding of relay AS1 to the negative potential 19 and through the winding of relay AS and resistor R3 to potential 19 for operating relays AS and AS1. Upon operating, relay AS closes a locking path for itself through its contact 1 to ground and also opens its contact 2 to prevent this locking ground from holding relay AS1 operated after relay C is released. When operated, relay AS1 closes its contact 1 to shunt the winding of relay SS to ground and thereby causes its release. As previously described, the release of relay SS releases lockout circuit 17 and receiver 18 and makes them available to serve other calls. The release of circuit 17, in turn, opens the operate circuit for relay C and causes it to release. The release of relay C opens its contact 1 for releasing relay AS1.

While operated, relay AS1 closes a ground potential through its contact 2 to signal the control circuit 11 to erase messages recorded on medum 171. After the erasure is completed, equipment 3 is prepared for automatically answering calls to line L1.

After sending the activate digit, the customer may place the telephone handset on the switchhook and thereby cause the release of the switch connection between lines L1 and ARL as hereinbefore described. When the connection to line ARL is released, ground is removed from conductor S for releasing relay SA. The release of relay SA opens its contact 3 to cause the release of relay RP. Relay SA also opens its contact 4 to disconnect resistor R1 and inductor L from across line ARL and thereby remove the "off-hook" condition on line ARL to prevent the initiation of a dial tone call. Upon releasing, relay SA also closes its contacts 4 and 5 for connecting the ring detecting apparatus comprising relay RD1 and diodes D5 to D8 through contacts 3 and 4 of relay AS to line L1. Transfer circuit 1 is then prepared for connecting future incoming calls on line L1 to equipment 3.

AUTOMATIC ANSWER

When a call from any telephone station is extended to line L1, as set forth in the Busch patent, ringing voltage is supplied to the line and is extended through contacts 6 and 7 of relay TA, contacts 3 and 4 of relay AS, contacts 4 and 5 of relay SA and diodes D5 to D8 for operating relay RD1. Upon operating, relay RD1 closes its contact 1 for completing the operating circuit for relay TA from ground potential on sleeve conductor S1 through the contact 1 and the winding of relay TA to the negative potential 20. Ground is supplied to conductor S1 as explained in the Busch patent, when the hold magnets associated with the conductor S1 are operated.

When operated, relay TA closes a locking path from itself through its contact 8 to ground on conductor S1. Relay TA also opens its contacts 6 and 7 to cause the release of relay RD1 and to isolate the called customer station from the established connections. This isolation eliminates any confusion that might arise by having the called customer answer the call at the same time that the answer announcement is sent to the caller.

The operation of relay TA also closes its contacts 9 and 10 to connect the equipment 3 to line L1 and the calling line. Relay TA also opens its contacts 2 and 3 to prevent the ringing of line L1 from activating the relay RD. Operated relay TA closes its contact 11 to connect resistor R1 and inductor L across the line L1 for tripping ringing and for maintaining an "off-hook" condition on the lines. Upon operating, relay TA also opens its contacts 1 and 4 to prevent any incoming call to line ARL from interfering with the call on line L1. Calls may be extended to line ARL as far as contacts 1 and 4 of relay TA while the call on line L1 is being served, however, a "no answer" condition is presented to the caller. Relay TA, when operated, opens its contacts 5 and 6 for disconnecting cable C1 from the call connection to prevent spurious tone signals from activating detector 15.

The operating relay TA also closes ground potential through contact 12 to signal the control circuit 11 to initiate the transmission of the answer announcement from equipment 3 through contacts 9 and 10 of relay TA over line L1 to the calling customer. If the calling party disconnects or abandons the call before the entire announcement is transmitted, a calling party disconnect circuit, as disclosed in the cited Keith et al. patent, operates to detect the disconnection and to apply a ground potential to the reset conductor RS to shunt down relay TA and thereby to effect its release. Equipment 3 and transfer circuit 1 then return to the standby condition in which they rested prior to the receipt of the call on line L1.

When announcement service is provided without the incoming message recording feature, ground potential is applied to conductor RS at the end of the announcement, causing the release of the relay TA and thereby the return of the equipment 3 and circuit 1 to the standby condition.

When both announcement and recording service are provided the announcement informs the caller that he may record a message. At the end of the announcement, equipment 3 recycles the announcement circuit to prepare it for retransmitting the announcement to a subsequent caller and also connects transducer 54 to the line L1 for recording the caller's message.

Announcement and record equipment 3 is arranged to supply a momentary tone signal to the caller to inform him when to start recording his message. A momentary tone is also sent at periodic intervals during the recording to inform the caller that the message is being recorded. Such signals are also sent to notify the caller when the recording period is about to expire.

At the end of the 30 second recording interval, or when the caller disconnects earlier, equipment 3 momentarily grounds conductor RS and then prepares for answering another call. The ground on conductor RS, or the removal of ground from conductor S1 when the caller disconnects, causes the release of relay TA and thereby returns the transfer circuit 1 to the condition in which it rested prior to the receipt of the call on line L1. When relay TA is released first, it opens its contact 11 to send an "on-hook" signal over line L1 for causing the release of call connections in the central office.

The manner in which such connections are disengaged when either the calling or called line disconnects is fully described in the Busch patent.

MESSAGE PLAYBACK TO CUSTOMER STATION

A call is originated over line L1 through the central office to line ARL for obtaining a message playback to the customer station. As previously described, after the call connections are established between L1 and ARL, relays RP and SA are operated and an order tone signal is momentarily sent from generator 14 to line L1 to notify the customer to transmit sequentially the access and playback digits 0 and 3. Access digit 0 is transmitted first to cause the receiver 18 to be connected to line ARL as previously explained.

When the tone signals representing the digit 3 are transmitted to line ARL, they are extended over the previously described path to receiver 18, which translates them and extends ground through contact 3 of the operated relay C to complete the obvious circuit for operating relay PB.

The operation of relay PB closes its contact 1 to shunt the winding of the previously operated relay SS to ground and thereby causes it to release. As previously described, the release of relay SS releases circuit 17 and receiver 18 to make them available to serve other calls. Upon the release of circuit 17, relays C and PB are also released While operated, relay PB closes a momentary ground potential through its contact 2 for signaling the control circuit 11 to play back to the customer the messages recorded on the medium 171.

If during the playback, the customer desires to have one or more messages repeated or to skip certain messages, he depresses the telephone pushbuttons for transmitting to line ARL the access digit and a jumpback, reverse or advance digit. The access digit causes the receiver 18 to be connected with line ARL as previously explained.

When a single message is to be replayed, a jumpback digit 4 is transmitted to the receiver 18 which translates the digit and connects ground potential through contact 4 of relay C to complete the obvious operate circuit for relay JB. The operated relay JB extends ground potential through its contact 1 to signal of control circuit 11 to backspace the transducer 54 a fixed increment on medium 171. After the backspacing, the playback of messages is resumed.

Upon operating, relay JB closes ground through its contact 2 to cause the release of relay SS and, in turn, the release of circuit 17 and receiver 18 to make them available to serve other calls. The release of circuit 17 causes the release of relays C and JB.

If the customer desires to replay a number of messages, he transmits a reverse digit 5 immediately after the access digit 0. Receiver 18 translates the received digit 5 and extends ground through contact 5 of relay C to operate the relay RE of FIG. 3. The operated relay RE closes ground through its contact 1 and contact 3 of relay SM for signaling the control circuit 11 to move the transducer 54 toward the area on medium 171 where the first incoming message is recorded. This reverse movement continues until the customer transmits a stop digit as hereinafter explained.

On the other hand, if the customer desires to skip a number of messages during the playback, he transmits an advance digit 6 immediately after the access digit 0. Receiver 18 translates the digit 6 and extends ground through contact 6 of relay C to operate the relay A of FIG. 3. Upon operating, relay A closes ground through its contact 1 and contact 2 of relay SM for signaling the control circuit 11 to move transducer 54 toward the area on medium 171 where the last customer message is recorded. The forward advance of the transducer continues until the customer transmits a stop digit. Equipment 3 includes apparatus for stopping the reverse and forward movements of transducer 54 at the extreme ends of the medium 171.

It is noted that the receiver 18 remains connected to line ARL while the forward or reverse movement of transducer 54 is in progress. Hence, when the customer wishes to stop the transducer movement, he transmits a stop digit 7 to receiver 18 which when translates the receiver digit and extends ground through contact 7 of relay C to operate relay SM. When operated, relay SM closes ground through its contact 1 to cause the release of relay SS and, in turn, the release of circuit 17 and receiver 18. Upon the release of circuit 17, relays C, SM and RE or A are released.

When operated, relay SM opens its contacts 2 and 3 for signaling the control circuit 11 to stop temporarily the movement of transducer 54 and then to resume the movement of transducer 54 for effecting a playback. While the latter movement of transducer 54 is in progress but before a message is played back from medium 171 control circuit 11 momentarily couples the transducer 21 to line ARL and thereby causes a prerecorded index announcement to be transmitted from medium 22 to the customer. In the case where transducer 54 has been moved to the extreme end of medium 171, where the very last 30 second message is recorded, the index announcement informs the customer of this condition and that no message will be played back unless the access and reverse digits are transmitted, as hereinbefore explained, to move transducer 54 to another area of medium 171. When transducer 54 is at any other area on medium 171 except the aforementioned end, the announcement identifies which one of the 30 second messages recorded on medium 171 is presently to be played back.

Transducers 21 and 54 are moved at all times in the same direction and at the same rate of speed across corresponding points on the recording medium with which they are associated. For example, when transducer 54 is moved across the extreme left hand side of medium 171 toward the right side during the recording of an incoming message, transducer 21 is moved at the same rate of speed and in the same direction from the left side of medium 22.

After the message playback is completed, if the customer desires to retain the recorded messages on medium 171 for future reference and to continue the answering service, he transmits the access digit 0 to detector 15 for causing receiver 18 to be connected to line ARL, as previously described, and then sequentially transmits the reverse or advance and stop digits for setting the transducer 54 to the area of medium 171 on which no messages are recorded. As previously explained, after the movement of transducer 54 is stopped momentarily, an index announcement is transmitted to the customer. This announcement permits him to determine the number of 30 second messages which may yet be recorded on medium 171.

On the other hand, if the customer desires to erase the messages recorded on medium 171 after the playback is completed, he transmits the access digit 0 to detector 15 for connecting receiver 18 to line ARL, as previously described, and thereafter transmits the activate digit 2 to receiver 18. The latter circuit translates the received digit and extends ground through contact 1 of relay C and contact 5 of relay RP to operate relay AS1. When operated, the latter relay closes its contact 1 to effect the release of relay SS which, in turn, causes the release of circuit 17, receiver 18 and relays AS1 and C, as previously explained. Upon operating, relay AS1 closes a momentary ground through its contact 2 for signaling the control circuit 11 to erase the recorded message from medium 171 and to reset transducer 54 for recording a first incoming message on medium 171.

After either receiving the index announcement or transmitting the activate digit, the customer may place the telephone handset on the switchhook and thereby effect the release of the connections between lines L1 and ARL and the relays in transfer circuit 1, as previously explained. The circuits of FIG. 2 are then prepared for serving incoming calls to either line L1 or ARL.

MESSAGE PLAYBACK TO REMOTE STATION

Intraoffice and interoffice calls may be originated to line ARL from any remote station, that is, one other than station S1, to obtain a playback of messages recorded on medium 171. On such calls, the entire directory number of line ARL is used to direct the establishment of call connections. This directory number is the equivalent of the two digit code customer uses when originating a call from the phone at station S1. This number is unlisted and should be kept secret since anyone who knew the number could obtain a message playback.

When either an intraoffice or interoffice call is extended to line ARL, ringing current is applied to its conductors T and R and is extended through contacts 1 to 4 of relays TA and diodes D1 to D4 for operating relay RD. Upon operating, relay RD closes a ground from conductor S through its contact 3 to operate relay SA.

The operation of relay SA opens at its contacts 4 and 5 in the operate path for relay RD1 so that an incoming call to line L1 will not interfere with the message playback. On such a call, therefore, ringing is applied to line L1 until either someone at station S1 answers the phone or the calling party abandons the call.

When operated, relay SA closes its contact 6 to connect resistor R1 and inductor L across line ARL for tripping ringing and thereby causing the release of relay RD. The release of relay RD closes ground through its contact 4, contact 7 of relay SA and contact 4 of relay RP for signaling the control circuit 11 to initiate the playback of the messages recorded on medium 171.

If the customer originated the instant call to line ARL from a telephone set arranged to transmit MF signals, he could transmit the access, jumpback, advance, reverse, and stop digits to control, as previously explained, the repeating and skipping of recorded caller messages during the course of the playback.

The customer may also send the announcement prepare, activate and deactivate digits to the receiver 18 during the course of the call; however, these digits do not cause receiver 18 to operate the relays AP or AS1, as hereinbefore described, nor to operate relay D and release relay AS, as explained later, because the relay RP is not operated. The latter relay is operated, as described previously, under control of check circuit 9 only on calls from station S1. Hence, when any of these digits are transmitted to receiver 18 on a call from a remote station, receiver 18 causes the operation of relay NE of FIG. 3. For example, after an announcement prepare digit 1 is sent, receiver 18 extends ground through contact 2 of relay C and contacts 7 and 8 of relay RP to the winding of relay NE for operating the relay. Relay NE indicates that the customer is not entitled to the requested service. Upon operating, relay NE closes its contact 1 to shunt the winding of relay SS to ground for releasing relay SS and thereby causing the equipment of FIG. 3 to return to the idle condition, as previously discussed, so that other requests for receiver 18 can be served.

After the message playback is completed to the remote station, the customer may place the telephone handset on the switchhook and thereby cause the release of call connections, and the restoration of the equipment 3 and transfer circuit 1 to the condition in which they rested prior to the receipt of the call. Other calls to line L1 may then be answered as previously explained.

DEACTIVATE ANSWERING SERVICE

To deactivate the service, call connections are established between station S1 and line ARL as hereinbefore described. After the ringing on line ARL is tripped, as described previously, the customer transmits the access digit 0 to establish connections between line ARL and receiver 18, and thereafter transmits the deactivate digit 8. Receiver 18 translates the received digit and extends ground through contact 8 of relay C and contact 9 of relay RP to operate relay D. Upon operating, relay D closes its contact 1 to effect the release of relay SS which, as previously described, causes the release of circuit 17, receiver 18 and relay D. While operated, relay D closes its contact 2 to shunt the winding of relay AS to ground and thereby cause its release. The release of relay AS opens at its contacts 3 and 4 in the operate circuit for relay RD1 so that future incoming calls to line L1 are not answered by equipment 3.

Upon conclusion of the digit transmission, the customer may replace the handset on the switchhook and thereby cause the release of call switch connections and the transfer circuit 1 as described previously.

While the equipment of this invention has been described with reference to an embodiment in a particular telephone system, it is to be understood that such an embodiment is intended to be illustrative of the principles of the invention and that numerous other embodiments may be derived by those skilled in the art without departing from the spirit and scope of my invention. For example, the exemplary embodiment is not arranged to enable the control digits to be sent to the answering equipment from dial pulse type telephone sets because the intraoffice and incoming trunk circuits of the switching system are not arranged for dial pulse repeating. However, it is obvious to those skilled in the art that conventional dial pulse repeating trunk circuits could be incorporated into the system for enabling a dial pulse telephone to control the answering equipment. In an answering system controlled by dial pulses, it is also necessary to use dial pulse translating equipment in place of the time shared MF equipment.

What is claimed is:

1. A communication system comprising a switching office, a plurality of communication lines connected to said office, recording equipment at said office, means responsive to signals from a first one of said lines for connecting said first line to said equipment, means actuated by control signals from said first line for conditioning said equipment to record an announcement subsequently received from said first line, and means responsive to subsequent incoming calls on said first line from other of said lines for supplying the recorded announcement over said first line to said other lines for answering said calls.

2. A communication system comprising a central office, a plurality of communication lines connected to said office, recording equipment at said office, means responsive to the initiation of a call for recording service on one of said lines for connecting said calling line wtih said equipment, means actuated by control signals from said calling line for conditioning said equipment to record messages subsequently received on calls to said calling line, and means responsive to coded signals received from any line for playing back the recorded messages to said last-mentioned line.

3. A communication system comprising a switching office, a plurality of communication lines connected to said office, answering equipment at said office including means for assuring that a line initiating a call for answering service is entitled to said service, recording means, means responsive to control signals from said assuring means and coded signals from a calling line entitled to such service for preparing said recording means to record an announcement subsequently received from said entitled line, and means controlled by order signals from said entitled line for supplying the recorded announcement to lines subsequently calling said entitled line.

4. A communication system according to claim 3 wherein said answering equipment further comprises means operative after said announcement is sent to a line calling said entitled line for recording a message received from said calling line, and means activated by other order signals from said entitled line for playing back the recorded messages to said entitled line.

5. A communication system according to claim 4 wherein said answering equipment further comprises means responsive to coded signals from said entitled line for repeating the playback of a recorded message to said entitled line.

6. A communication system according to claim 4 wherein said answering equipment further comprises means responsive to distinct coded signals from said entitled line for skipping the playback of part of the recorded messages to said entitled line.

7. A telephone system comprising a switching office, a plurality of telephone lines connected to said office, means responsive to answering service signals from a calling one of said lines for assuring that the calling line is entitled to answering service, an answer and record line at said office, means actuated by said assuring means for connecting an entitled calling line to said answer and record line, a recording device at said office, means responsive to control signals received from said entitled line over said answer and record line for conditioning said device to record an announcement subsequently received from said entitled line, and a transfer circuit including means activated by order signals on said answer and record line for detecting subsequent calls to said entitled line, means actuated by said detecting means for connecting said entitled line to said device, and means controlled by said connecting means for supplying the recorded announcement to said entitled line to answer said calls.

8. A telephone system according to claim 7 further comprising means responsive ot other order signals received from said entitled line for deactivating said detecting means to interrupt the answering service for said entitled line.

9. A telephone system according to claim 8 wherein said assuring means further comprises means for enabling said detecting means to be activated and deactivated only by order signals sent from said entitled line to said answer and record line.

10. A telephone system comprising a switching office, a plurality of telephone lines connected to said office, means responsive to answering service signals received from a calling one of said lines for assuring that the calling line is entitled to the service, answering equipment at said office, means actuated by said assuring means for conditioning said equipment to serve an entitled calling line, said answering equipment including means activated by control signals from said entitled line for detecting subsequent incoming calls to said entitled line, means controlled by said detecting means for supplying a recorded announcement to said entitled line to answer said calls, means operative each time after said announcement is supplied to said line for recording messages received from other lines, and means responsive to coded signals from any of said lines for supplying the recorded messages to said last-mentioned lines.

11. A telephone system comprising a switching office, a plurality of telephone lines connected to said office, means responsive to answering service signals received from any one of said lines for assuring that the calling line is entitled to the service, a plurality of answer and record lines at said office, means actuated by said assuring means for connecting an entitled calling line to a predetermined one of said answer and record lines, a circuit connectable to any one of said answer and record lines for translating order signals, a lockout circuit responsive to control signals received from said answer and record lines for connecting the latter lines one at a time to said translating circuit, means connectable to said entitled line for detecting incoming calls on said entitled line, apparatus in said translating circuit activated by a first order signal from said predetermined answer and record line for connecting said detecting means to said entitled line, and means actuated by said detecting means for supplying an announcement to said entitled line to answer incoming calls thereon.

12. A telephone system according to claim 11 further comprising a recording device, and apparatus in said translating circuit responsive to a second order signal from said predetermined answer and record line for conditioning said recording device to record an announcement subsequently received from said entitled line and to supply the recorded announcement to said entitled line.

13. A telephone system according to claim 12 further comprising apparatus in said translating circuit responsive to a third order signal from said predetermined line for deactivating said connecting apparatus to disconnect said detecting means from said entitled line.

14. A telephone system according to claim 11 further comprising equipment operative each time after the announcement is supplied to said entitled line to answer an incoming call for recording messages received from the caller, and means in said translating circuit responsive to a fourth order signal from said predetermined line for conditioning said equipment to play back the recorded messages to said entitled line.

15. A telephone system according to claim 11 further comprising record means bearing a plurality of distinct index signals for uniquely identifying each of the messages recorded on said recording device, and means in said translating circuit responsive to order signals from said predetermined line for supplying any one of said index signals to said predetermined line.

16. A telephone system according to claim 15 further comprising means responsive to a call from any one of said lines to said predetermined line for conditioning said record means to play back the recorded messages to said calling line.

17. A telephone system according to claim 16 wherein said assuring means comprises means for permitting only first, second and third order signals sent from said entitled line to activate said connecting, conditioning and deactivating apparatuses, respectively; and wherein said translating circuit comprises apparatus activated by any of said first, second and third order signals sent to said predetermined line from any one of said lines other than said entitled line for effecting the disconnection of said translating circuit from said predetermined line.

18. A telephone system according to claim 17 wherein said lockout circuit comprises means controlled upon the activation of each of said apparatuses for disconnecting said translating circuit from said predetermined line.

19. A telephone system according to claim 16 wherein said record means comprises means for repeating a recorded message during a playback and wherein said translating circuit comprises apparatus responsive to order signals from a line to which a recorded message is played back for conditioning said repeating means to repeat the message to said last-mentioned line.

20. A telephone system according to claim 19 wherein said record means comprises means for skipping a recorded message during a playback, and wherein said translating circuit comprises apparatus responsive to order signals from the line to which recorded messages are played back for conditioning said skipping means to skip a message during the playback.

21. The telephone system according to claim 20 wherein said translating circuit comprises means for translating each order signal comprising a pair of tone signals into a unidirectional current for controlling a discrete one of said apparatuses.

22. A telephone system comprising a switching network, a plurality of lines having appearances at said network, a customer telephone set, a first one of said lines connected between said set and a first line appearance at said network, recorder equipment individual to said set, a second of said lines connected between said equipment and a second line appearance at said network whereby connection can be made through said network directly to said equipment, means responsive to signals from said set for controlling said recorder equipment, and means responsive to a particular signal from said set and to the subsequent presence of an incoming call at said first line appearance of said network for connecting said equipment to said first line appearance and disconnecting said equipment from said second line appearance.

23. A communication system comprising a switching office, a plurality of communication lines connected to said office, recording equipment at said office, means responsive to signals from a first one of said lines for connecting said first line to said equipment, means actuated by control signals from said first line for conditioning said equipment to record an announcement subsequently received from said first line, means responsive to subsequent calls on said first line for supplying the recorded announcement to said first line to answer said calls, means operative after a call on said first line is answered with said recorded announcement for recording messages received on said first line, and means responsive to code signals received from any line for playing back said recorded messages to said last-mentioned line.

24. A telephone system comprising a switching network, a plurality of lines having appearances at said network, a customer telephone set, a first one of said lines connected between said set and a first line appearance at said network, recorder equipment individual to said set, a second of said lines connected between said equipment and a second line appearance at said network whereby connection can be made through said network directly to said equipment, means responsive to a first signal from said set for connecting said equipment to said first line appearance, means responsive to other signals from said set for controlling said equipment, means for connecting said set through said first line appearance, said network and said second line appearance to said equipment, and means for assuring that said set is entitled to control said recorder equipment for at least some of said other signals.

25. A communication system comprising a switching office, a plurality of communication lines connected to said office, recording equipment at said office, means responsive to signals from a first one of said lines for connecting said first line to said equipment, means actuated by control signals from said first line for conditioning said equipment to record an announcement subsequently received from said first line, means responsive to subsequent incoming calls on said first line from other of said lines for supplying the recorded announcement to said other lines for answering said calls, and means operative after a call on said first line is answered with said recorded announcement for recording messages subsequently received on said first line.

References Cited in the file of this patent

UNITED STATES PATENTS

| | | |
|---|---|---|
| Re. 23,054 | Deakin | Dec. 7, 1948 |
| 2,979,568 | Logan | Apr. 11, 1961 |